United States Patent Office 3,277,027
Patented Oct. 4, 1966

3,277,027
POLYURETHANE PLASTICS PREPARED FROM A NITROGEN CONTAINING POLYOL
Hans-Joachim Hennig, Cologne-Stammheim, Otto Bayer, Leverkusen-Bayerwerk, and Gunther Braun, Cologne-Flittard, Germany, assignors to Farbenfabriken Bayer Aktiengesellschaft, Leverkusen, Germany, a German corporation
No Drawing. Filed Sept. 11, 1963, Ser. No. 308,077
Claims priority, application Germany, Sept. 19, 1962, F 37,836
5 Claims. (Cl. 260—2.5)

This invention relates to polyurethane plastics and to intermediates which are useful for the preparation of polyurethane plastics. More particularly, this invention is concerned with nitrogenous polymers which have improved properties for the preparation of polyurethane plastics.

It has been proposed heretofore to prepare nitrogen containing polyols. For example, it is well known to react ethylene diamine with propylene oxide to prepare a product having terminal hydroxyl groups. This product, when reacted with an organic polyisocyanate, especially in the presence of a blowing agent, yields highly desirable cellular polyurethane plastics. However, the heretofore known nitrogenous polyols of this type have not been without their disadvantages. One disadvantage is that they often have a relatively high viscosity. Another disadvantage is that unless relatively large amounts of alkylene oxides are added to the amino groups, they have a very high hydroxyl content which, in turn, takes a lot of organic polyisocyanate in order to have a completely cross-linked polymer. Still further, the tertiary nitrogen atom which results when the amino hydrogen reacts with the alkylene oxide has a strong accelerating effect on the reaction between the isocyanato group and the hydroxyl group. While this is an advantage in some cases, it is a disadvantage where it is desirable to have long casting times, particularly for cellular polyurethane plastics.

It is, therefore an object of this invention to provide active hydrogen containing compounds which contain nitrogen and which avoid the disadvantages set forth above. Another object of the invention is to provide polyurethane plastics based on these active hydrogen containing compounds. Another object of the invention is to provide improved polyethers for the preparation of polyurethane plastics, which polyethers contain nitrogen. Still a further object of this invention is to provide for the preparation of polyurethane plastics which have improved resistance to hydrolysis. A further object of the invention is to provide cellular polyurethane plastics based on nitrogen containing polyols which have improved physical properties. Another object of this invention is to provide polyols suitable for the preparation of polyurethane plastics and containing nitrogen which are less viscous, light colored materials having a reduced tendency to accelerate the reaction between themselves and an organic polyisocyanate.

The foregoing objects and others which will become apparent from the following description are accomplished in accordance with the invention, generally speaking, by providing active hydrogen compounds and polyurethane plastics prepared therefrom, said active hydrogen containing compounds having the general formula

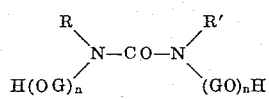

or

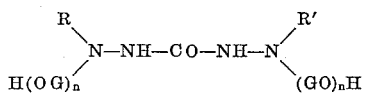

wherein R is a hydrogen atom, R' is the same as R or is an alkyl group, preferably having from 1 to 10 carbon atoms, G is an alkylene group, preferably having from 2 to 10 carbon atoms and n is a positive integer which preferably yields a molecular weight for the whole compound of up to about 5,000.

Therefore, this invention contemplates polyols having the above formulas, and polyurethane plastics prepared therefrom. The polyols may be prepared by reacting a urea with dialkanol amines or N,N-bis-hydroxy alkyl hydrazines, preferably in the molar ratio of about 1:2, ammonia being split off in the reaction. Starting from monoalkyl ureas or N,N'-dialkyl ureas, the polyols of the present invention are obtained in a similar manner but with an alkyl amine being split off. The reaction of monoalkanol amines and monoalkyl alkanol amines with urea provides polyols in which R and R' in the foregoing formulas are either a hydrogen atom or an alkyl group. The initial products are then modified with an alkylene oxide or it is possible for the alkylene oxide to be added directly to urea whereby compounds in which n is greater than 1 in accordance with the above formulas are obtained. The molecular weight is preferably less than 5,000 and desirably within the range of from about 600 to about 3,000, or even 4,000. It is also possible by varying the addition of at least 2 different oxides to produce products with a block-like structure.

Any suitable urea may be used including methyl urea, N,N'-dimethyl urea, ethyl urea, N,N'-diethyl urea, propyl urea, N,N'-dipropyl urea, urea and the like.

Any suitable alkanol amine may be used such as, for example, ethanolamine, diethanolamine, methyl ethanolamine, propanolamine, dipropanolamine, ethyl propanolamine, butanolamine, dibutanolamine, propyl ethanolamine, stearyl propanolamine, dodecyl ethanolamine, bis-(beta-phenyl-beta-hydroxyethyl) amine or any other suitable amine which preferably has the formula

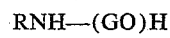

wherein R is a hydrogen atom or an alkyl group and G is as defined above.

Any suitable hydrazine derivatives may be used such as, for example, N,N-bis-(hydroxy ethyl) hydrazine, N,N-bis-(hydroxy propyl) hydrazine, N,N-bis-(hydroxy butyl) hydrazine and the like or any other suitable hydrazine which preferably has the formula

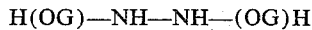

wherein G has the meaning set forth above.

Any suitable alkylene oxide may be used including, for example, ethylene oxide, propylene oxide, 1,2-butylene oxide, 2,3-butylene oxide, amylene oxide, cyclohexene oxide, styrene oxide, epihalohydrins such as, epichlorohydrin and the like.

In order to produce the starting materials, urea can be heated with dialkanolamines or N,N-bis-(hydroxyalkyl)-hydrazines to temperatures preferably between 60 and 200° C. while stirring vigorously, the urea dissolved after a short time and ammonia starts to split off. The reaction can be accelerated by adding catalytically active substances, e.g. small quantities of alkali, such as NaOH, but this is usually unnecessary. In order to facilitate the splitting off of ammonia, the condensation can be carried out under reduced pressure, e.g. in a water jet vacuum. It can be followed by following the decrease in weight or by measuring the viscosity. The ammonia gas liberated in the condensation can be collected. Water may be split off during the condensation to a small degree while the reactants are heated, and this does not reduce the value of the starting materials for the process according to the invention. On the contrary, the functional nature thereof is improved and this increases their importance as a branching component. Biuret derivatives can also be formed as a secondary products by self-condensation of the urea and these derivatives likewise comprise hydroxyalkyl groups, so that they do not have to be removed from the starting material for the process according to the invention.

For the reduction of the hydroxyl content of the starting materials and also for the substitution of the hydrogen atoms of primary and secondary amino groups which may be present in small quantity, the addition of alkylene oxides (of which propylene oxide is preferred) is preferably effected at temperatures between 80 and 200° C., if desired under pressure. The use of a preferably basic cataylst such as an alkali metal hydroxide, e.g. NaOH, or alkali metal alcoholate, e.g. sodium methylate, is usually only necessary for the formation of starting materials of relatively high molecular weight.

The polyols are colorless to slightly colored viscous liquids or resins. By comparison with polyfunctional amino alcohols, they have a lower basicity and therefore, because of weak catalytic efficiency, have only a slight influence on the numerous reactions taking place during the foaming, so that no limits are set as regards the quantities thereof when used in foamable reaction mixtures. On account of their excellent miscibility and compatibility, they can be processed together with other polyhydroxyl compounds, such as those usually employed for the production of foam materials.

The polyols thus obtained are useful particularly for the preparation of polyurethane plastics including foams coatings, elastomers, castings and the like. For the production of polyurethane plastics, the polyol is reacted with an organic polyisocyanate. In some cases, it is desirable to mix the polyol of this invention with an additional organic compound containing at least two active hydrogen containing groups as determined by the Zerewitinoff method.

Any suitable organic compound containing at least two active hydrogen containing groups as determined by the Zerewitinoff method, said groups being reactive with an isocyanate group, may be reacted with an organic polyisocyanate in accordance with the process of the present invention. The active hydrogen atoms are usually attached to oxygen, nitrogen or sulphur atoms. Thus, suitable active hydrogen containing groups as determined by the Zerewitinoff method which are reactive with an isocyanate group include —OH, —NH$_2$, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols and the like; aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and an —SH group and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5,000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta diethylsuccinic acid, trimellitic acid, trimesic acid, mellophanic acid, prehnitic acid, isophthalic acid, terephthalic acid, hemimellitic acid, benzenepentacarboxylic acid, 1,4-cyclohexanedicarboxlic acid, 3,4,9,10 - perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6- hexane diol, 1,7-heptane diol glycerine, trimethylol propane 1,3,6-hexane triol, triethanolamine, pentaerythritol, sorbitol and the like.

Any suitable polyhydric polyalkylene ether may be used as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol such as glycerine, trimethylol propane, pentaerythitol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, volume 7, pp. 257–262, published by Interscience Publishers, Inc. (1951), or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the prepartion of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentane-1,5-diol, 2-hexene-1,6-diol, 2-heptene-1,7-diol and the like; alkyne diols such as, for example, 2-butyne-1,4-diol, 1,5-hexadiyne-1,6-diol and the like; alkane triols such as, for example, 1,3,6-hexane triol, 1,3,7-heptane triol, 1,4,8-octane tri ols, 1,6,12-dodecane triol and the like; alkene triols such as, 1-hexene-1,3,6-triol and the like; alkyne triols such as 2-hexyne-1,3,6-triol and the like; alkane tetrols such as, for example, 1,2,5,6-hexane tetrol and the like; alkyne tetrols such as, for example, 4-octyne-1,2,7,8-tetrol and the like; alkene tetrols such as, for example, 3-heptane-1,2,6,7-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used for example, aromatic polyamines, such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridine, 2,4-diamino-5-aminomethyl pyrimidine, 2,5-diamino-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N',N'-tetrakis (2-hydroxy propyl)ethylene diamine, as well as compounds of any of the classes set forth which are substituted with halogen such as, for example, chloro, iodo, bromo and the like; nitro; alkoxy, such as, for example, methoxy, ethoxy, propoxy, butoxy, and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphate and the like.

It is also possible to use polyphosphites or alkoxylated phosphoric acids such as, for example, those disclosed in U.S. Patents 3,099,939 and 3,061,625.

Any suitable organic polyisocyanate may be used. The polyisocyanates can be aliphatic and aromatic polyvalent isocyanates e.g. alkylene diisocyanates, such as tetramethylene, decamethylene and hexamethylene diisocyanates, arylene diisocyanates and their alkylation products such as phenylene diisocyanates, naphthylene diisocyanate, diphenylmethane diisocyanate, toluylene diisocyanates such as toluylene 2,4- and 2,5-diisocyanates, di- and tri-isopropylbenzene diisocyanates and triphenylmethane triisocyanate, p-isocyanato-phenyl-thiophosphoric acid triesters, aralkyl diisocyanates such as 1-(isocyanatophenyl)-ethylisocyanates or the xylylene diisocyanates, as well as polyisocyanates substituted by various substituent such as OR, NO$_2$, Cl, and also polyisocyanates modified with less than equivalent quantities of polyhydroxyl compounds (such as trimethylol propane, hexanetriol, glycerine and butanediol). Polyisocyanates masked with phenols or bisulphite, acetal-modified isocyanates and also polymerized isocyanates with isocyanurate rings are also mentioned as examples.

Any suitable crude isocyanate may be used such as, for example, crude toluylene diisocyanate obtained by the phosgenation of a mixture of toluylene diamines or crude diphenyl methane isocyanates obtained by the phosgenation of crude diphenyl methane diamines or the crude p,p'-diphenylene diisocyanates, crude naphthylene-1,5-diisocyanates, crude hexamethylene diisocyanates and crude decamethylene diisocyanates obtained by phosgenating the corresponding amines. Crude diphenyl methane diamine is the reaction product of aniline and formaldehyde in the presence of HCl and contains some tri- and higher polyamines. A preferred unrefined or crude isocyanate is one having from about 26 to about 33 percent free —NCO and an amine equivalent of about 120 to about 150, such as, for example, a product having about 32 percent free —NCO and an amine equivalent of about 140. A specified crude isocyanate suitable for use in accordance with the present invention may be obtained by reacting about 60 parts of aniline with about 25 parts of formaldehyde (37 percent aqeous) and about 74 parts of HCl (30 percent aqueous) at a temperature of about 90° C. to about 100° C. for about 1.5 to about 2 hours and then reacting this product with NaOH and separating out the crude amine. About 100 parts of phosgene are then reacted with the crude amine until a product having an amine equivalent of about 135 and containing about 31 percent free —NCO is obtained. The free excess phosgene and substantially all of the solvents used, if any, are then removed. When toluylene diisocyanates, for example, are produced by conventional phosgenation of the corresponding diamines, a product containing about 90 percent 2,4- and 2,6-toluylene diisocyanate and the balance a crude residue of imidazoles and the like resulting in the phosgenation is obtained from the phosgenator. This product may also be used. It is preferred to phosgenate a mixture of ortho- and para-toluylene diamines. A specific product is the undistilled reaction mixture obtained by the phosgenation of 80 percent 2,4- and 20 percent 2,6-toluylene diamine containing 90 percent of a mixture of about 80 percent 2,4- and 20 percent 2,6-toluylene diisocyanate and the balance polymers incapable of accurate analysis.

The commercially available crude 4,4'-diphenyl methane diisocyanate having an assay of about 90 percent maximum, an amine equivalent of 141 maximum, about 0.04 to about 0.4 percent by weight hydrolyzable chloride, about 0.1 to about 0.6 percent by weight total chloride and having a flash point of about 430° F. may be used. As pointed out above, when toluylene diisocyanate for example, is produced by conventional phosgenation of the corresponding diamine, a product containing about 90 percent 2,4- and 2,6-toluylene diisocyanate is obtained from the phosgenator. Of course, the product from the phosgenator is subjected to distillation to remove the solvent so that a product having 90 percent 2,4- and 2,6-toluylene diisocyanate is obtained. The initial product from the phosgenator in most cases contains about 80 percent by weight of solvent. The 2,4- and 2,6-toluylene diisocyanate may be mixed with any suitable amount of the residue obtained if the isocyanate is refined and then reconstituted. In this event, it is preferred to have at least 50 percent of the refined isocyanate present. The crude polyisocyanates disclosed in Canadian Patent 665,495 are suitable.

The polyol of this invention is preferably used in the preparation of cellular polyurethane plastics by reaction thereof either alone or in admixture with another active hydrogen containing compound with an organic polyisocyanate in the presence of a blowing agent. Suitable processes for the preparation of cellular polyurethane plastics are disclosed in U.S. Reissue Patent 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free —NCO groups which is then reacted in a second step with water to prepare a foam. Alternately, the components may be reacted in a single working step. Furthermore, instead of water, low boiling hydrocarbons such as pentane, hexane, heptane, pentene, heptene and the like; azo compounds, halogenated hydrocarbons such as, dichloro difloromethane, trichlorofluoromethane, dichlorodifluoroethane, vinylidine chloride and the like may be used as blowing agents. It is often advantageous in the production of cellular polyurethane plastics to include other additives in the reaction mixture such as, for example, emulsifiers, from stabiliziers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula

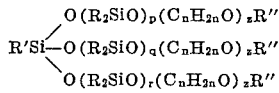

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula

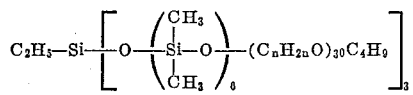

wherein $(C_nH_{2n}O)$ is a mixed polyoxyethylene and oxypropylene block copolymer containing about 17 oxyethylene units and about 13 oxypropylene units.

Since the basicity and catalytic activity of the poly-(hydroxyalkyl)-hydrazines is only slight, tertiary amines can be employed as a catalyst so that the reaction between the isocyanate groups and the hydroxy groups on the poly-(hydroxyalkyl)-hydrazines will proceed at the desired speed, such as, for example, dimethyl benzyl-amine, dimethylstearyl amine, permethylated diethylene triamine, N-methyl-N'-dimethylaminoethyl piperazine, N,N'-endoethylene piperazine, N-alkyl morpholines; tertiary aminoethers such as, for example, 1-alkoxy-3-dialkylamino-propane, tertiary amines with ester groups, salts of tertiary amines, especially with organic acids such as, for example, oleic acid, benzoic acid and the like, dibutyl tin dilaurate, dibutyl tin di-2-ethyl hexoate, dibutyl tin bis (dimethylamino caproate), stannous octoate lead naphthenate, ferric acetylacetonate, mixtures thereof and any other catalyst which will promote the reaction between isocyanate groups and active hydrogen atoms as determined by the Zerewitinoff method such as those disclosed in "Catalysis of the Isocyanate-Hydroxyl Reaction," J. W. Britain and P. G. Gemeinhardt, Journal of Applied Polymer Science, volume IV, issue No. 11, pages 207–211 (1960).

The polyols of the invention may also be used for the production of coating compositions. In this case, the polyol is reacted with the organic polyisocyanate in an inert organic solvent therefor such as, for example, dimethylformamide, the diethyl ether of diethylene glycol, benzene, xylene, benzine or the like.

It is also possible to use the polyols of the invention in the preparation of elastomeric products which are non-porous, for example, by reacting the polyol with an excess of an organic polyisocyanate in a first step to prepare an isocyanato-terminated prepolymer under anhydrous conditions. This prepolymer is then reacted in a second step with a chain extending agent such as, for example, 1,4-butane diol, 1,3-butane diol, the bis-beta-hydroxy ethyl ether of hydroquinone, water or the like by mixing the crosslinking agent with the prepolymer and casting the resulting mixture in a mold.

The polyurethane plastics of the invention are useful where polyurethanes have been used heretofore. For example, the foams are useful for cushions and especially rigid foam is useful for both sound and thermal insulation, for example, for walls of buildings. The coatings may be used to coat wood or metals such as steel and the like. The elastomers are useful, for example, for the production of tires or for molded items such as gear wheels or the like.

The invention is further illustrated by the following examples in which parts are by weight unless otherwise specified.

*Production of the starting materials*

(A) The mixture of about 532 g. (about 4 mols) of bis-(2-hydroxypropyl)-amine and about 120 g. (about 2 mols) of urea is heated to about 135° C. A clear melt is formed and ammonia starts to split off. After about 1 hour, evacuation is carried out and heating under a water jet vacuum is continued for another 20 hours until the weight of the reaction mixture has decreased by about 48 g. (i.e. about 2.8 mols of ammonia). A colorless, moderately viscous liquid is obtained (hydroxyl number about 968).

For reducing the hydroxyl content, about 328 g. (about 5.66 mols) of propylene oxide are added to about 606 g. of this urea-dipropanolamine condensation product at about 120° C. over a period of about 18 hours without adding a catalyst. A light yellow clear liquid is formed (hydroxyl number about 681; viscosity about 1850 cp./25° C.).

(B) About 180 g. (about 3 moles) of urea and about 630 g. (about 6 mols) of diethanolamine are heated for about 11 hours to about 130° C. and thereafter for about another 9 hours at about 80° C. in water jet vacuum until about 102 g. (about 6 mols) of ammonia are split off. The colorless liquid has an hydroxyl number of about 1230.

To about 681 grams of this condensation product, there are added about 876 g. of propylene oxide at about 130–140° C. in the course of about 18 hours. A clear reddish brown liquid is obtained (hydroxyl number about 608; viscosity about 462 cp./25° C.).

(C) About 888 g. (about 6 mols) of N,N-bis-(2-hydroxypropyl) hydrazine and about 180 g. (about 3 mols) of urea are heated while stirring vigorously for about 13 hours to about 130–140° C., whereby there is a reduction in weight by about 117 g. (i.e. about 6.9 mols of ammonia). In order to remove the last traces of ammonia, nitrogen is conducted for about 1 hour at about 110° C. through the condensation product.

A colorless clear resin is obtained (hydroxyl number about 780).

(D) About 320 g. of $N^1$, $N^4$-tetra-(2-hydroxypropyl)-carbo-bis-hydrazide, which can be obtained from N,N-dipropanol hydrazide and urea according to C, have added thereto a solution of about 1.2 g. of sodium in about 30 ml. of an hydrous methanol. After carefully removing the alcohol by heating to about 80° C. under a water jet vacuum, about 516 g. of propylene oxide are added in about 15 hours at about 120° C. Thereafter, neutralization is carried out with the calculated quantity of hydrochloric acid and the water is removed under water jet vacuum at 80–90° C. After filtration by means of a suction filter, a light brown liquid is obtained (hydroxyl number about 447; viscosity about 2238 cp./25° C.).

(E) 832 g. (13.6 mols) of ethanol amine are heated for 17 hours to 135° C. with 408 g. (6.8 mols) of urea until 232 g. (13.6 mols) of ammonia are split off under reduced pressure. A light-yellow clear liquid is formed (OH number 978) which crystallizes within some days.

To 967 g. of this condensation product are added 995 g. (17.15 mols) of propylene oxide at 130° C. A clear reddish-brown liquid is obtained (hydroxyl number 717; viscosity 1385 cp./25° C.).

(F) Urea, diethanol amine and N-methyl ethanol amine are reacted at 135° C. in a molar ratio of 1:1:1 while splitting off 1.84 mols of ammonia. The light-yellow condensation product has a viscosity of 2400 cp./25° C. and a hydroxyl number of 1038.

For reducing the hydroxyl content 584 g. of the condensation product are reacted with 265 g. of propylene oxide at 135° C. A clear reddish-brown liquid is obtained (hydroxyl number 783; viscosity 501 cp./25° C.).

(G) For comparison 532 g. (4 mols) of diisopropanol amine are reacted for 16 hours to 135° C. with firstly 120 g. (2 mols) of urea and secondly with 148 g. (2 mols) N-methyl urea. Ammonia and methyl amine respectively are removed in water jet vacuum. Nearly colorless condensation products are obtained which are very similar as to their composition as can be seen, if the viscosities (30,920 cp./25° C. and 36,680 cp./25° C. respectively) and hydroxyl numbers (930 and 939 respectively) are compared.

EXAMPLES 1–11

| No. | a | b | c | d | e | f | g | h | i |
|---|---|---|---|---|---|---|---|---|---|
| 1 | A 50 |  | 50 | 174 |  |  | 0.3 | 6 |  |
| 2 | A 50 | 50 |  | 128 |  |  | 0.5 |  | 30 |
| 3 | B 30 | 70 |  | 124 |  |  | 0.3 | 6 |  |
| 4 | B 30 | 70 |  | 108 |  |  | 0.5 |  | 30 |
| 5 | C 20 |  | 80 | 158 |  | 3 | 0.3 | 6 |  |
| 6 | C 20 | 80 |  | 111 | 2.0 |  | 0.5 |  | 30 |
| 7 | D 70 | 30 |  | 148 | 2.0 |  | 0.3 | 6 |  |
| 8 | D 70 | 30 |  | 102 | 2.0 |  | 0.5 |  | 30 |
| 9 | E 50 | 50 |  | 132 | 0.5 |  | 0.5 |  | 50 |
| 10 | E 30 | 50 | 50ˣ | 131 | 10ˣ | 2 | 0.5 | 6 | 30 |
| 11 | E 10 | 90 |  | 102 |  |  | 0.5 |  | 30 | a=starting material.
b=polyester of adipic acid, phthalic acid anhydride, oleic acid and trimethylol propane (OH number about 380).
c=branched polyether from trimethylol propane and propylene oxide (OH number about 380).
cˣ=propoxylated phosphoric acid (OH number 380).
d=diphenylmethane-4,4'-diisocyanate (about 90% crude material).
e=permethylated aminoethyl piperazine.
eˣ=trichloro ethyl phosphate.
f=N-ethyl morpholine.
g=polysiloxane-polyalkylene glycol ester.
h=sodium-castor oil sulphate (about 50% water content).
i=trichlorofluoromethane.

The quantities of the components as indicated in parts by weight in the table are quickly and thoroughly mixed and the mixture introduced into molds. Fine-pored hard foam materials are immediately formed and have the properties indicated in the following table.

| No. | a | b | c | d | e |
|---|---|---|---|---|---|
| 1 | 48 | 3.7 | 0.2 | 130 | 4 |
| 2 | 30 | 2.9 | 0.2 | 140 | 1.5 |
| 3 | 38 | 2.9 | 0.2 | 130 | 3 |
| 4 | 31 | 2.5 | 0.2 | 105 | 2 |
| 5 | 38 | 2.2 | 0.3 | 140 | 3 |
| 6 | 33 | 1.8 | 0.4 | 122 | 2.5 |
| 7 | 31 | 2.1 | 0.2 | 140 | .6 |
| 8 | 27 | 1.9 | 0.3 | 120 | 6 |
| 9 | 23 | 2.0 | 0.2 | 130 | 3.1 |
| 10 | 29 | 2.3 | 0.3 | 120 | 4 |
| 11 | 34 | 1.9 | 0.4 | 110 | 2.8 | a=density.
b=compressive strength, kp./cm.²
c=impact toughness, cm. kp./cm.²
d=hot-bending strength, ° C.
e=water absorption, percent by volume.

In the foregoing working examples the specific diphenylmethane 4,4'-diisocyanate (about 90%) in every case is the crude reaction product obtained by phosgenating the reaction product of aniline with formaldehyde under acid conditions, the resulting crude mixture of organic polyisocyanates containing 90 percent diisocyanate and the balance higher polyisocyanates.

In the foregoing working examples, the specific polysiloxane polyalkylene glycol ester used in every case is the compound having the formula

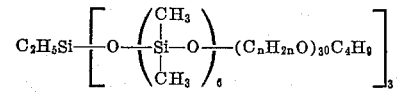

wherein ($C_nH_{2n}O$) is a mixed polyoxyethylene and oxypropylene block copolymer containing about 17 oxyethylene units and about 13 oxypropylene units.

It is also to be understood that the foregoing working examples are given for the purpose of illustration and that, if the teachings of this disclosure are followed, any other suitable urea, alkanolamine, bis-(hydroxy alkyl) hydrazine, organic polyisocyanate, stabilizer, polyol or the like may be used.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A cellular polyurethane plastic prepared by a process which comprises reacting in the presence of a blowing agent an organic polyisocyanate with a compound having the formula

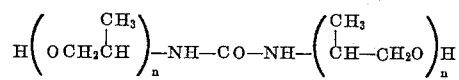

wherein n is a positive integer sufficient to yield a molecular weight for the whole compound of up to about 5,000.

2. A cellular polyurethane plastic prepared by a process which comprises reacting in the presence of a blowing agent, an organic polyisocyanate and a compound selected from the group consisting of

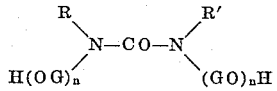

and

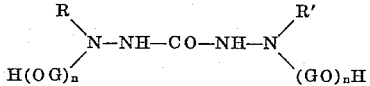

wherein R is selected from the group consisting of hydrogen and the group —(GO)$_n$H, R' is selected from the group consisting of R and an alkyl group, G is an alkylene group having 2 to 10 carbon atoms and n is a positive integer.

3. A cellular polyurethane plastic prepared by a process which comprises reacting in the presence of a blowing agent, an organic polyisocyanate with a compound having the formula

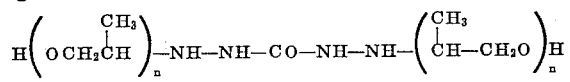

wherein $n$ is a positive integer sufficient to yield a molecular weight for the whole compound of less than about 5,000.

4. The cellular polyurethane plastic of claim 2 wherein said blowing agent is a halohydrocarbon.

5. The cellular polyurethane plastic of claim 2 wherein said organic polyisocyanate is an impure 4,4'-diphenylmethane diisocyanate having an assay of 90 percent and an amine equivalent of 141 maximum.

References Cited by the Examiner

UNITED STATES PATENTS

| | | | |
|---|---|---|---|
| 2,123,718 | 7/1938 | DeGroote | 260—553 |
| 2,414,211 | 1/1947 | Rosin et al. | 260—553 |
| 2,501,783 | 3/1950 | Morgan | 260—553 |
| 3,029,208 | 4/1962 | Khawam | 260—2.5 |
| 3,075,927 | 1/1963 | Lanham | 260—2.5 |
| 3,136,731 | 6/1964 | Piechota et al. | 260—2.5 |

FOREIGN PATENTS

| | | |
|---|---|---|
| 768,192 | 2/1957 | Great Britain. |
| 804,300 | 11/1958 | Great Britain. |

LEON J. BERCOVITZ, *Primary Examiner.*

DONALD E. CZAJA, *Examiner.*